United States Patent
Tashiro et al.

(10) Patent No.: US 12,071,175 B2
(45) Date of Patent: Aug. 27, 2024

(54) VEHICLE FRONT BODY STRUCTURE

(71) Applicant: Mazda Motor Corporation, Hiroshima (JP)

(72) Inventors: Kuniyoshi Tashiro, Hiroshima (JP); Ippei Kuroda, Hiroshima (JP); Hiroto Kido, Hiroshima (JP); Ayaka Fukuda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 304 days.

(21) Appl. No.: 17/737,036

(22) Filed: May 5, 2022

(65) Prior Publication Data

US 2022/0379964 A1    Dec. 1, 2022

(30) Foreign Application Priority Data

May 28, 2021    (JP) ................. 2021-090358

(51) Int. Cl.
*B60R 19/34*    (2006.01)
*B62D 21/15*    (2006.01)

(52) U.S. Cl.
CPC ............ *B62D 21/152* (2013.01); *B60R 19/34* (2013.01)

(58) Field of Classification Search
CPC .... B62D 25/20; B62D 25/2018; B62D 25/08; B62D 21/152; B60R 19/34
USPC ....... 293/133, 149; 296/203.01, 2, 187.09, 1
See application file for complete search history.

(56) References Cited

U.S. PATENT DOCUMENTS 9,499,111 B2 * 11/2016 Watanabe ............ B62D 21/152

FOREIGN PATENT DOCUMENTS

JP          6237702 B2 * 11/2017
JP    2018-144578 A     9/2018

OTHER PUBLICATIONS

JP-6237702 Text 2017.*

* cited by examiner

*Primary Examiner* — Dennis H Pedder
(74) *Attorney, Agent, or Firm* — XSENSUS LLP

(57) ABSTRACT

A front side frame provided on each of right and left sides of the vehicle and extending in a vehicle longitudinal direction; and a bumper beam provided on a vehicle front side of each of the front side frames and having an inclined section in each end portion in a vehicle width direction, the bumper beam extending outward in the vehicle width direction and being inclined rearward in. A crash can is provided in a front end portion of each of the front side frames, extends forward, and is inclined outward in the vehicle width direction. A front end portion of each of the crash cans is coupled to the respective inclined section of the bumper beam. On an inner side in the vehicle width direction of each of the crash cans, a vulnerable portion is provided, and has low strength against a collision load input to the bumper beam.

12 Claims, 15 Drawing Sheets

VEHICLE FRONT BODY STRUCTURE

CROSS-REFERENCE TO RELATED APPLICATION

The present application claims priority to Japanese Patent Application 2021-090358, filed May 28, 2021, the entire contents of which are incorporated herein by reference.

BACKGROUND

Field

The present disclosure relates to a vehicle front body structure.

Description of the Related Art

In general, a crash can is provided in a front portion of a vehicle to absorb energy of a collision load that is generated during a collision of the vehicle. This crash can is provided to a front end portion of a front side frame, and the front side frame extends in a vehicle longitudinal direction and is arranged on each of right and left sides of the front portion of the vehicle. A front end portion of this crash can is coupled to a bumper beam that extends in a vehicle width direction. Accordingly, when the bumper beam receives the collision load, the collision load is input to the crash can via the bumper beam. In this way, the crash can is crushed and deformed, and thereby absorbs the energy of the collision load.

Conventionally, as disclosed in Patent document 1, a crash can that extends linearly in the vehicle longitudinal direction in a coaxial manner with the front side frame has been known. When the bumper beam receives the collision load, this crash can is axially compressed, and thereby absorbs the energy of the collision load.

PRIOR ART DOCUMENTS

Patent Documents

[Patent document 1] JP-A-2018-144578

SUMMARY

Technical Problems

In a vehicle front body structure disclosed in Patent document 1, the crash can is arranged to extend linearly in the vehicle longitudinal direction in the coaxial manner with the front side frame. Each end portion in the vehicle width direction of the bumper beam, which is provided in a front end portion of the crash can, extends outward in the vehicle width direction and is inclined rearward in the vehicle.

Accordingly, in the case where a collision with a low offset rate, such as a small overlap collision or a full-frontal collision, occurs, the crash can is crushed from the front end portion thereof, and thereby sufficiently absorbs the energy of the collision load. Meanwhile, in the case where a collision with the high offset rate, that is, a so-called offset collision occurs, the crash can receives the collision load having a component in a direction orthogonal to the inclined section of the bumper beam (in the case where the inclined section is curved, in a direction orthogonal to a tangent line thereof, that is, a normal direction). In this way, the collision load is applied to the crash can in a direction of bending the crash can, which possibly buckles the crash can. When the crash can buckles, the crash can cannot absorb the energy of the collision load sufficiently.

The present disclosure has been made in view of such a point and therefore has a purpose of being able to absorb energy of a collision load in a full-frontal collision or an offset collision.

Means for Solving the Problems

In order to achieve the above purpose, a crash can is arranged in a manner to extend forward in a vehicle and be inclined outward in a vehicle width direction. A vulnerable portion is provided on an inner side in the vehicle width direction of the crash can.

More specifically, a vehicle front body structure disclosed herein is a vehicle front body structure including: a front side frame that is provided on each of right and left sides of the vehicle and extends in a vehicle longitudinal direction; and a bumper beam that is provided on a vehicle front side of each of the front side frames and has an inclined section in each end portion in a vehicle width direction, the inclined section extending outward in the vehicle width direction and being inclined rearward in the vehicle, in which the crash can is provided to a front end portion of each of the front side frames, extends forward in the vehicle, and is inclined outward in the vehicle width direction, a front end portion of each of the crash cans is coupled to the respective inclined section of the bumper beam, and a vulnerable portion is provided on an inner side in the vehicle width direction of each of the crash cans, and has low strength against the collision load from front of the vehicle.

According to this vehicle front body structure, in the case where the vehicle is involved in an offset collision, due to provision of the inclined section at each end in the vehicle width direction of the bumper beam, the crash can receives the collision load having a component in a direction orthogonal to the inclined section via the inclined section of the bumper beam.

This crash can is inclined in the direction orthogonal to the inclined section of the bumper beam with respect to the vehicle longitudinal direction. Accordingly, when the crash can receives the collision load by the offset collision via the inclined section of the bumper beam, in the collision load input to the crash can, a load component in an axial direction of the crash can is large. In this way, the crash can is suppressed from being bent inward in the vehicle width direction by the collision load of the offset collision, and the crash can is easily crushed and deformed.

However, in the case where the axial direction of the crush can is only inclined so as to become close to the direction orthogonal to the inclined section of the bumper beam, and attention is focused on load input in the axial direction of the crash can, the load input to an outer side in the vehicle width direction of the crash can is larger than load input to the inner side in the vehicle width direction thereof. Thus, while the outer side in the vehicle width direction of the crash can tends to be plastically distorted in the axial direction to absorb collision energy, the inner side in the vehicle width direction thereof is less prone to the plastic distortion. For this reason, the vulnerable portion is provided to the inner side in the vehicle width direction of the crash can, so as to promote the plastic distortion of the inner side in the vehicle width direction of the crash can in a similar manner to the outer side in the vehicle width direction of the crash can. In this way, absorption of the collision energy by the inner side in the vehicle width direction of the crash can is improved.

Next, in the case where the vehicle is involved in a full-frontal collision, the bumper beam receives the collision load from the front of the vehicle. This collision load is input to the crash can via the bumper beam. As described above, the crash can is inclined in consideration of the absorption of the collision energy in the case of the offset collision. Thus, due to the inclination of the crash can, the crash can tends to collapse outward from a base at the full-frontal collision. Thus, the vulnerable portion is provided on the inner side of the crash can such that the inner surface side is more likely to be plastically distorted than the outer surface side. In this way, the crash can is suppressed from collapsing outward, and the crash can is crushed and deformed at the full-frontal collision. As a result, absorption of the collision energy by the inner surface side is improved.

As described above, regardless of the offset collision or the full-frontal collision, the crash can efficiently absorbs the energy of the collision load that is input to the bumper beam.

In one aspect, a contour of a cross-section in a rear end portion of each of the crash cans has substantially the same shape as a contour of a cross-section in the front end portion of the respective front side frame.

In this way, the rear end portion of the crash can can firmly be supported by the front end portion of the front side frame. As a result, displacement in an unintended direction, such as buckling, of the crash can by the collision load is suppressed, and the crash can is easily crushed and deformed.

In another aspect, each of the crash cans has:
a lateral surface section that faces the inner side in the vehicle width direction;
an upper surface section that faces above in the vehicle; and
a lower surface section that faces below in the vehicle, and
the vulnerable portion is formed by a ridgeline notch that cuts out at least one of a ridgeline portion formed by the lateral surface section and the upper surface section and a ridgeline portion formed by the lateral surface section and the lower surface section.

In this way, the vulnerable portion can be formed in each of the crash cans by a simple method of forming the notch in at least one of the ridgeline portion formed by the lateral surface section and the upper surface section and the ridgeline portion formed by the lateral surface section and the lower surface section.

In another aspect, a horizontal rib is formed in each of the crash cans and extends in the vehicle longitudinal direction, and
the vulnerable portion is formed by a lateral surface notch that is opened to the inner side in the vehicle width direction, and is formed in a manner to partially cut the lateral surface section on the inner side in the vehicle width direction of the crash can away from the horizontal rib.

In this way, with the horizontal rib, the strength of the crash can against the collision load in the vehicle longitudinal direction can easily be designed to strength suited for absorption of the collision energy. Meanwhile, the strength of the crash can against the collision load can partially be reduced by partially cutting the inner side in the vehicle width direction away from the horizontal ribs by the lateral surface notch. In this way, the lateral surface notch functions as the vulnerable portion. Accordingly, each of the crash cans can be formed with the vulnerable portion by a simple method of forming the opening on the inner side in the vehicle width direction of the crash can.

In another aspect, a suspension housing is joined to an intermediate portion in the vehicle longitudinal direction of each of the front side frames,
an outer vulnerable portion is provided on the outer side in the vehicle width direction of each of the front side frames, is located on the vehicle front side of the respective suspension housing, and has low strength against the collision load from the front of the vehicle,
an inner vulnerable portion is provided on the inner side in the vehicle width direction of each of the front side frames, is located on the vehicle front side of the respective suspension housing, and has low strength against the collision load from the front of the vehicle, and
the strength of the outer vulnerable portion of each of the front side frames is greater than the strength of the inner vulnerable portion thereof.

When the vehicle is involved in the offset collision, the crash can receives the collision load in a direction orthogonal to the inclined section of the bumper beam. In this way, an inward bending force in the vehicle width direction is applied to the crash can, and the inward bending force in the vehicle width direction is also applied to the front side frame.

When the front side frame is bent and deformed, the outer side in the vehicle width direction of the front side frame is a tensile side, and the inner side in the vehicle width direction of the front side frame is a compressive side. For this reason, the strength of the outer vulnerable portion in the front side frame is made greater than the strength of the inner vulnerable portion, that is, the strength on the tensile side of the front side frame is made greater than the strength on the compressive side of the front side frame, so as to suppress bending deformation of the front side frame by this moment.

Only for a purpose of improving the strength on the outer side in the vehicle width direction of the front side frame to be greater than the strength on the inner side in the vehicle width direction of the front side frame, the inner vulnerable portion may only be provided to the front side frame. However, by providing the outer vulnerable portion to the vehicle front side of the front side frame from the suspension housing, the strength on the vehicle rear side of the front side frame becomes greater than the strength on the vehicle front side of the front side frame. Thus, when the front side fame receives the collision load, which is generated by the collision of the vehicle, the front side frame is sequentially crushed and deformed from the vehicle front side toward the vehicle rear side.

In another aspect, a longitudinal irregular bead is provided on each lateral surface in the vehicle width direction of each of the front side frame, and extends in the vehicle longitudinal direction,
the longitudinal irregular bead, which is provided on the outer side in the vehicle width direction of each of the front side frames, is formed with an outer bead width increased section as the outer vulnerable portion having a partially increased bead width,
the longitudinal irregular bead, which is provided on the inner side in the vehicle width direction of each of the front side frames, is formed with an inner bead width increased section as the inner vulnerable portion having a partially increased bead width, and
the outer bead width increased section of each of the front side frames has the smaller bead width than the inner bead width increased section thereof.

In this way, by providing the longitudinal irregular bead to each of the front side frames, the strength of the front side frame against the collision load is easily designed to the strength suited for absorption of the collision energy. In addition, the outer bead width increased section and the inner bead width increased section can be formed on the side frame by simple processing of partially increasing a vertical dimension of the longitudinal irregular bead. Furthermore, the strength of the outer bead width increased section can be made greater than the strength of the inner bead width increased section by simple processing of reducing the vertical dimension of each of the outer bead width increased sections to be smaller than the respective inner bead width increased section.

In another aspect, a vertical irregular bead as the outer vulnerable portion is formed on an outer surface in the vehicle width direction of each of the front side frames, and extends vertically, a vertical irregular bead as the inner vulnerable portion is formed on an inner surface in the vehicle width direction of each of the front side frames, and extends vertically, and a vertical dimension of the vertical irregular bead on the outer side in the vehicle width direction of each of the front side frames is smaller than a vertical dimension of the vertical irregular bead on the inner side in the vehicle width direction thereof.

In this way, the outer vulnerable portion and the inner vulnerable portion can be formed by simple processing of providing the vertically extending bead to the front side frame. In addition, the strength of the vertical irregular bead on the outer surface in the vehicle width direction of each of the front side frames can be made greater than the strength of the vertical irregular bead on the inner surface in the vehicle width direction by simple processing of reducing the vertical dimension of the vertical irregular bead on the outer surface in the vehicle width direction to be smaller than the vertical dimension of the vertical irregular bead on the inner surface in the vehicle width direction.

In another embodiment, each of the crash cans is formed with:

a vertical rib that extends in the vehicle longitudinal direction and couples the horizontal rib and one of the upper surface section and the lower surface section; and a notch that is opened to the upper surface section or the lower surface section in a manner to partially cut the upper surface section or the lower surface section of each of the crash cans away from the vertical rib, and the notch that is opened to the upper surface section or the lower surface section is formed on a vehicle front side of the vulnerable portion.

Just as described, each of the crash cans is formed with the lower surface notch, the upper surface notch, and the vulnerable portion, on which stress tends to be concentrated. When the vehicle is involved in the offset collision, the crash can receives the collision load from one of the inclined sections of the bumper beam. Since the upper surface notch and lower surface notch are formed on the vehicle front side of the vulnerable portion, the collision load is first transmitted to the upper surface notch and lower surface notch, and the stress is concentrated on the upper surface notch and lower surface notch. As a result, the upper surface notch and the lower surface notch are first crushed and deformed. Thereafter, the collision load, which has been transmitted to the upper surface notch and the lower surface notch, is transmitted to the vulnerable portion, on which the stress tends to be concentrated. As a result, the vulnerable portion is crushed and deformed.

As described above, since the crash can is formed with the upper surface notch and the lower surface notch, the collision load, which is generated by the offset collision, is transmitted to the vulnerable portion via crushing deformation of the upper surface notch and the lower surface notch. In this way, the crushing deformation of the vulnerable portion is promoted, and the absorption of the collision load energy by the crash can is thereby promoted.

Advantages

According to the present disclosure, it is possible to simultaneously achieve the absorption of the collision load energy generated by the full-frontal collision and the absorption of the collision load energy generated by the offset collision.

DESCRIPTION OF EMBODIMENTS

A detailed description will hereinafter be made on embodiments of the present disclosure with reference to the drawings. The following description on preferred embodiments are essentially and merely illustrative and thus has no intention to limit the present disclosure, application subjects thereof, and application thereof at all.

First Embodiment

Figure 1:
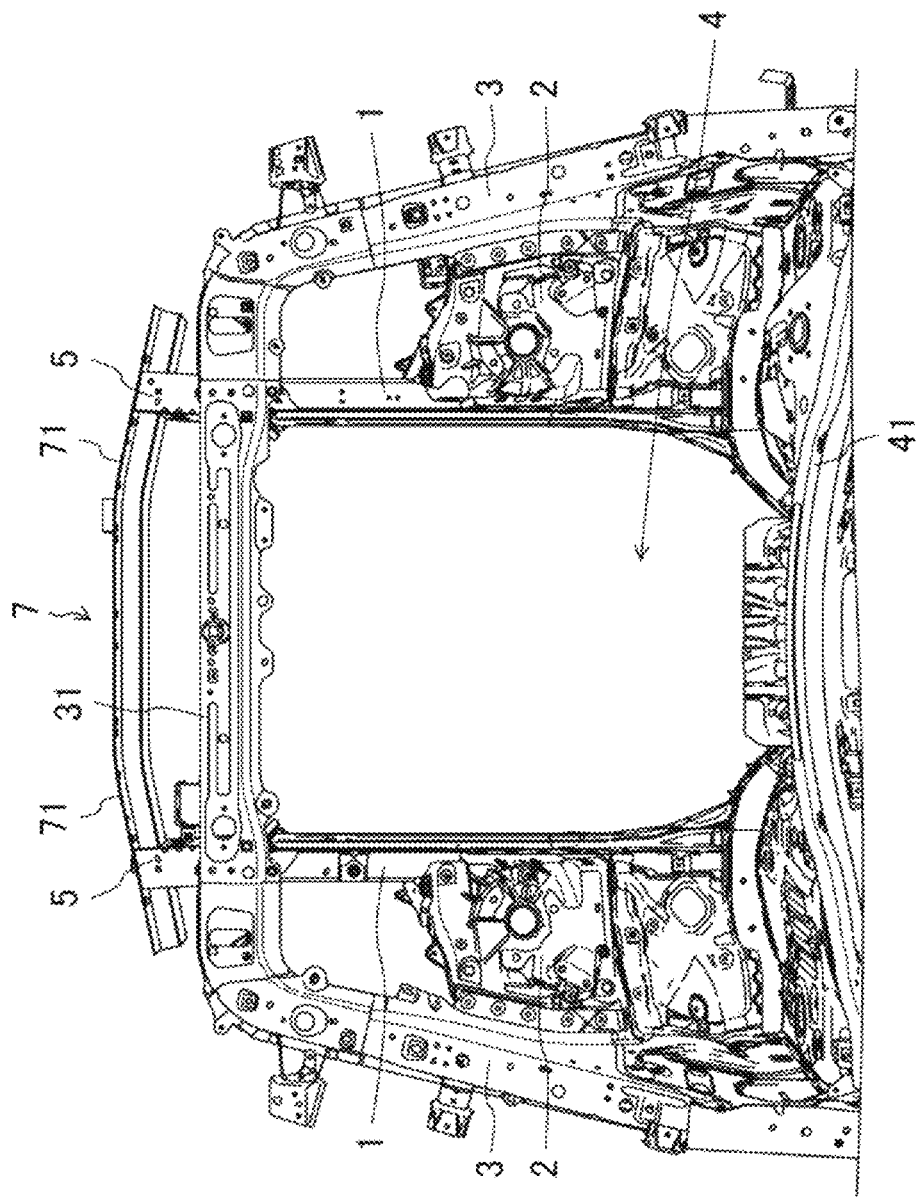
FIG. 1 is a top view illustrating a vehicle front body structure.
Figure 2:
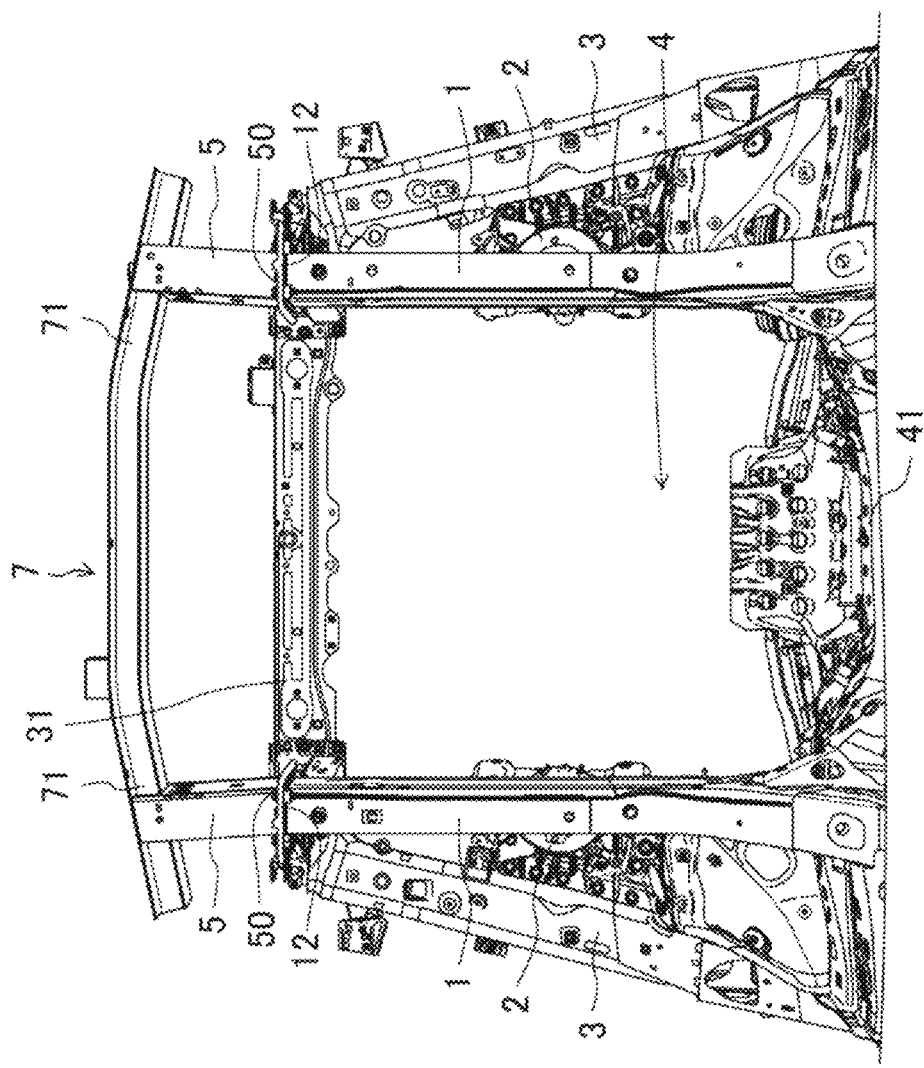
FIG. 2 is a bottom view illustrating the vehicle front body structure.
Figure 3:
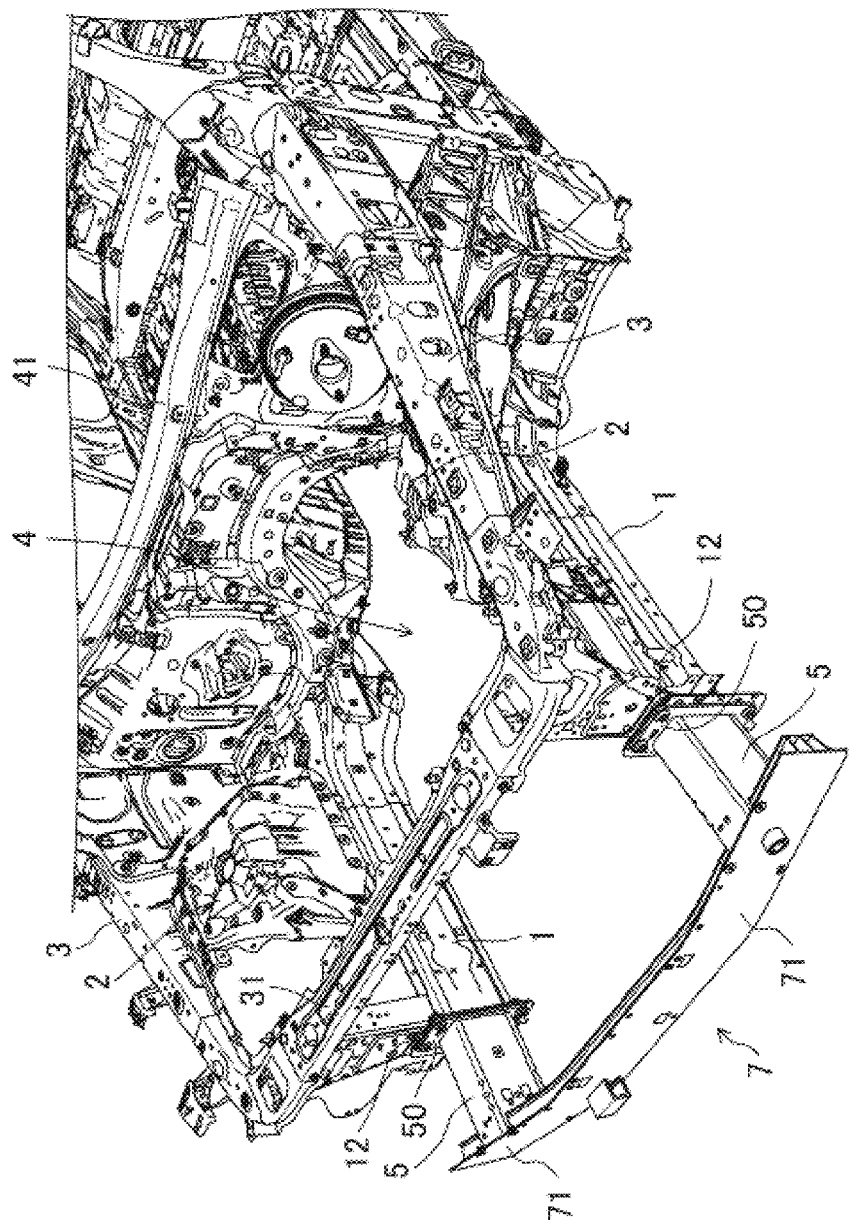
FIG. 3 is a perspective view illustrating the vehicle front body structure.

FIG. 1 to FIG. 3 illustrate a vehicle front body structure according to an embodiment of the present disclosure. In a front portion of this vehicle, a front side frame 1, a crash can 5, and a bumper beam 7 are provided. A pair of the front side frame 1 and the crash can 5 is provided on each side in a vehicle width direction. Each of the crash cans 5 is attached to a front end portion of the respective front side frame 1. A front end portion of each of the crash cans 5 is coupled to the bumper beam 7.

The front side frame 1 is provided on each of the sides in the vehicle width direction of the front portion of this vehicle, and extends in a longitudinal direction. Each of these front side frames 1 is provided in an end portion on a respective side in the vehicle width direction of an engine compartment 4, and an engine and a transmission for driving the vehicle are provided in the engine compartment 4. An apron member 3 is provided on an upper side (a sheet near side in FIG. 1) and an outer side in the vehicle width direction of each of the front side frames 1, and substantially extends in the vehicle longitudinal direction. Front end portions of the apron members 3 are coupled to each other via an upper shroud member 31.

A rear end portion of each of these front side frames 1 is formed in a manner to extend rearward in the vehicle and is inclined downward. At a position that is substantially the same as the positions of the rear end portions of these front side frames 1 in the vehicle longitudinal direction, a dashboard 41 is provided to separate the engine compartment 4 from a cabin.

A suspension housing 2 is joined to an intermediate portion in the vehicle longitudinal direction of each of the front side frames 1. On the outer side in the vehicle width direction of each of the front side frames 1, this suspension housing 2 forms a wheel house in which a wheel of the vehicle is arranged. A lower end portion of the suspension housing 2, which is provided on each of the sides in the vehicle width direction, is joined to the respective front side frame 1, and an upper end portion thereof is joined to the respective apron member 3.

A portion of each of the front side frames 1 in front of the respective suspension housing 2 extends in parallel with a body center line and in the vehicle longitudinal direction. A frame-side set plate 12 is fixed to a tip portion of each of these front side frames 1. A crash can-side set plate 50 is provided in the rear end portion of the crash can 5, and is fastened to the frame-side set plate 12. In this way, the crash can 5 is provided in the front end portion of the front side frame 1. This crash can 5 extends forward in the vehicle and is inclined outward in the vehicle width direction.

Each of the crash cans 5 extends forward in the vehicle and is inclined outward in the vehicle width direction.

A vertical dimension of the rear end portion of each of the crash cans 5 is substantially equal to a vertical dimension of the front end portion of the respective front side frames 1. In addition, a dimension in the vehicle width direction of the rear end portion of each of the crash cans 5 is substantially equal to a dimension in the vehicle width direction of the front end portion of the respective front side frames 1. Thus, a contour of the rear end portion of each of the crash cans 5 has substantially the same shape as a contour of the front end portion of the respective front side frames 1 while the crash can-side set plate 50 and the frame-side set plate 12 are interposed therebetween.

The bumper beam 7, which extends in the vehicle width direction, is provided in front of these crash cans 5. An inclined section 71 is provided in each end portion in the vehicle width direction of this bumper beam 7, and the inclined section extends outward in the vehicle width direction and is inclined to the rear in the vehicle. The front end portion of each of the above-described crash cans 5 is coupled to this inclined section 71, which is provided in the respective end portion in the vehicle width direction. An inclination angle of each of these crash cans 5 with respect to the vehicle longitudinal direction is smaller than an inclination angle of a direction orthogonal to the inclined section 71 of the bumper beam 7 with respect to the vehicle longitudinal direction.

<Configuration of Crash Can>

Figure 5:
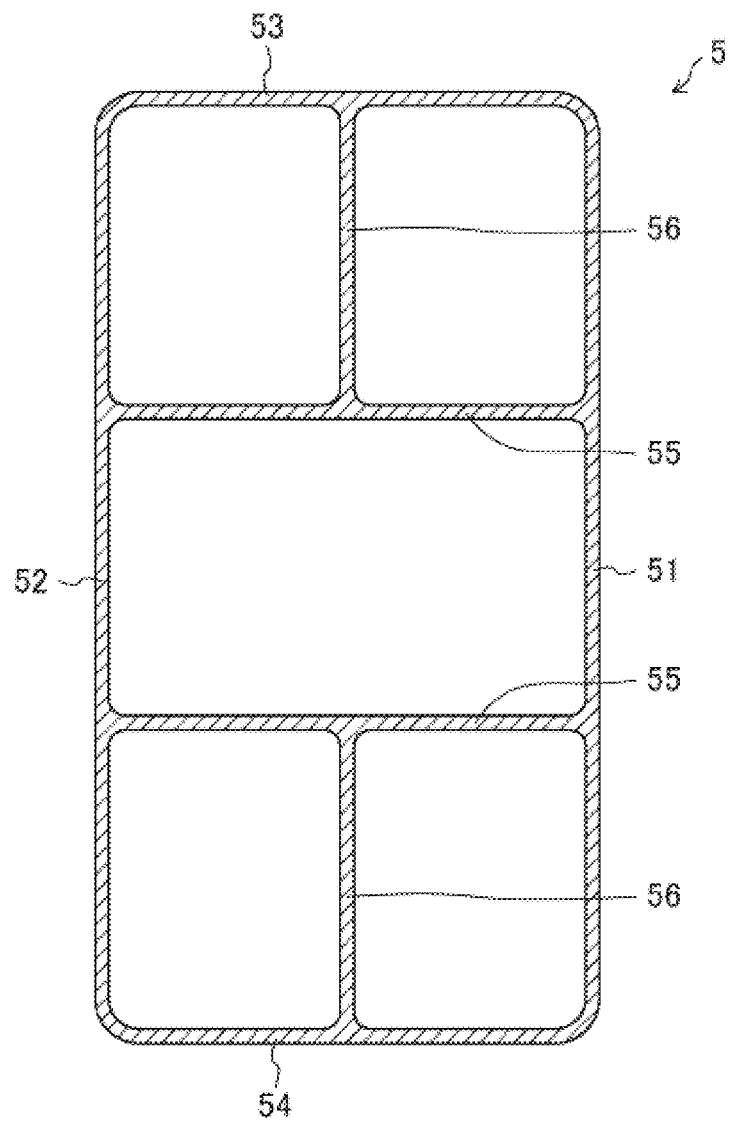
FIG. 5 is a cross-sectional view of the crash can that is taken along line V-V in FIG. 4.
Figure 6:
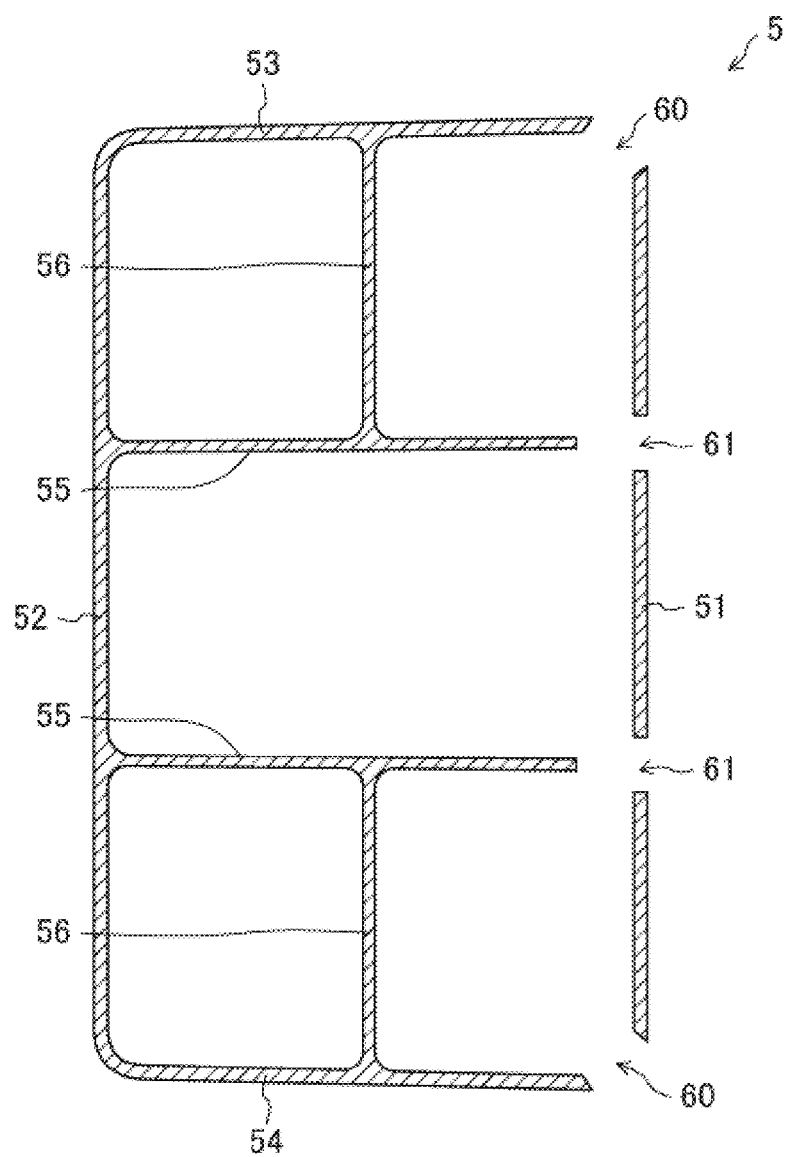
FIG. 6 is a cross-sectional view of the crash can that is taken along line VI-VI in FIG. 4.
Figure 7:
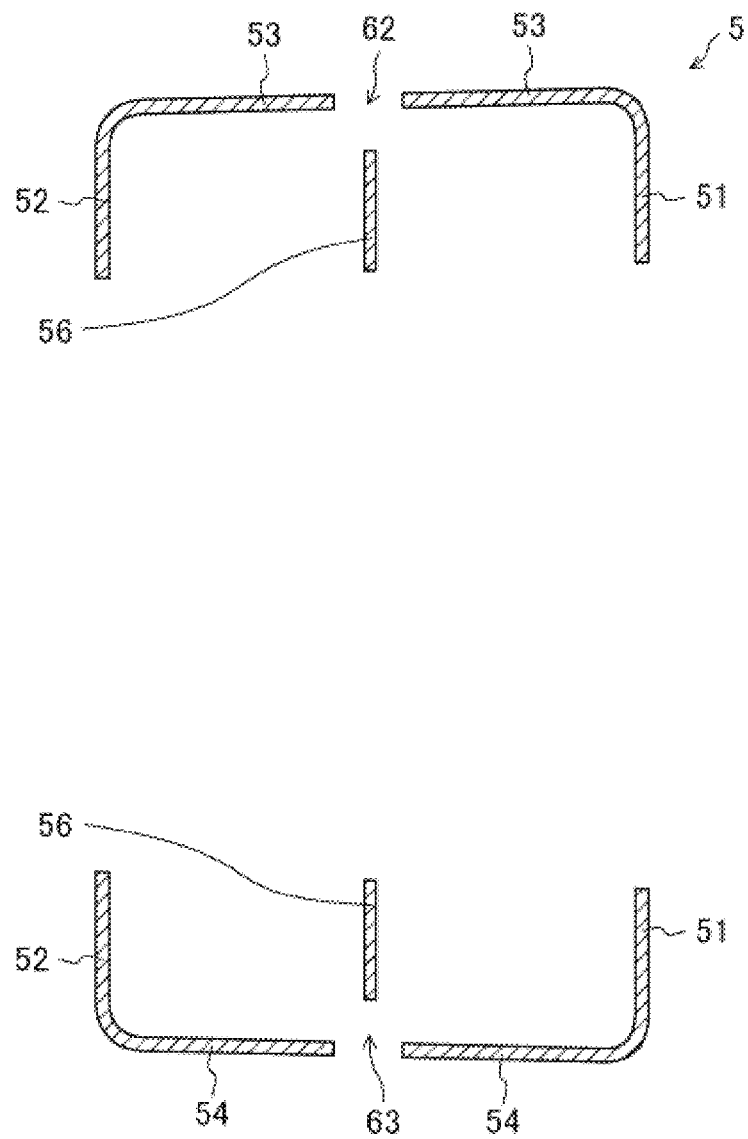
FIG. 7 is a cross-sectional view of the crash can that is taken along line VII-VII in FIG. 4.

The crash cans 5, which are provided on both of the sides in the vehicle width direction, have bilaterally-symmetrical structures. For this reason, a detailed description will be made on the structure of the crash can 5 on a right side (a right side in FIG. 1) in the vehicle width direction. As illustrated in FIG. 5 to FIG. 7, the crash can 5 has a rectangular cross-section that is long in the vertical direction. The crash can 5 has: an inner surface section 51 as a lateral surface section that faces an inner side in the vehicle width direction; an outer surface section 52 that faces the outer side in the vehicle width direction; an upper surface section 53 that faces above in the vehicle; and a lower surface section 54 that faces below in the vehicle. The crash can is an extruded member that is formed by extruding a material such as an aluminum alloy or a magnesium alloy.

Figure 8:
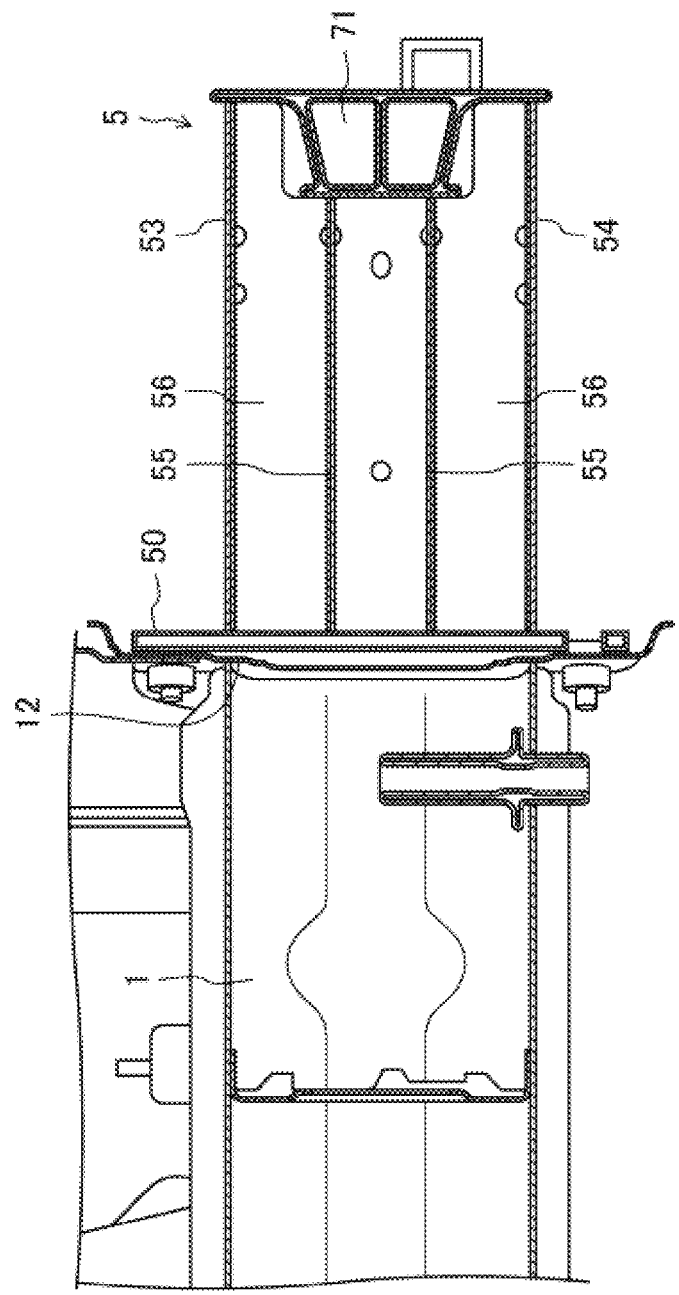
FIG. 8 is a cross-sectional view of the crash can and a front side frame that is taken along line VIII-VIII in FIG. 4.

As illustrated in FIG. 5, in this crash can 5, two horizontal ribs 55 are formed from the inner surface section 51 to the outer surface section 52. The two ribs 55 extend horizontally (in a right-left direction in FIG. 5), and are formed with a clearance being provided therebetween in the vertical direction (the vertical direction in FIG. 5). As illustrated in FIG. 8, each of these horizontal ribs 55 is formed to extend from the front end portion of the crash can 5 and the rear end portion thereof in the vehicle longitudinal direction (the right-left direction in FIG. 8). These horizontal ribs 55 are substantially formed in parallel with the upper surface section 53 and the lower surface section 54 of the crash can 5.

As illustrated in FIG. 5, a vertical rib 56 is provided in a substantially central portion in the vehicle width direction (the right-left direction in FIG. 5) of the horizontal rib 55 that is located on an upper side. The vertical rib 56 extends vertically, and couples the horizontal rib 55 and the upper surface section 53 of the crash can 5. In addition, the vertical rib 56 is provided in a central portion in the vehicle width direction of the horizontal rib 55 that is located on a lower side in FIG. 5. The vertical rib 56 extends vertically, and couples the horizontal rib 55 and the lower surface section 54 of the crash can 5. As illustrated in FIG. 8, each of these vertical ribs 56 is formed to extend from the front end portion of the crash can 5 and the rear end portion thereof in the vehicle longitudinal direction. These vertical ribs 56 are substantially formed in parallel with the inner surface section 51 and the outer surface section 52 of the crash can 5.

Figure 4:
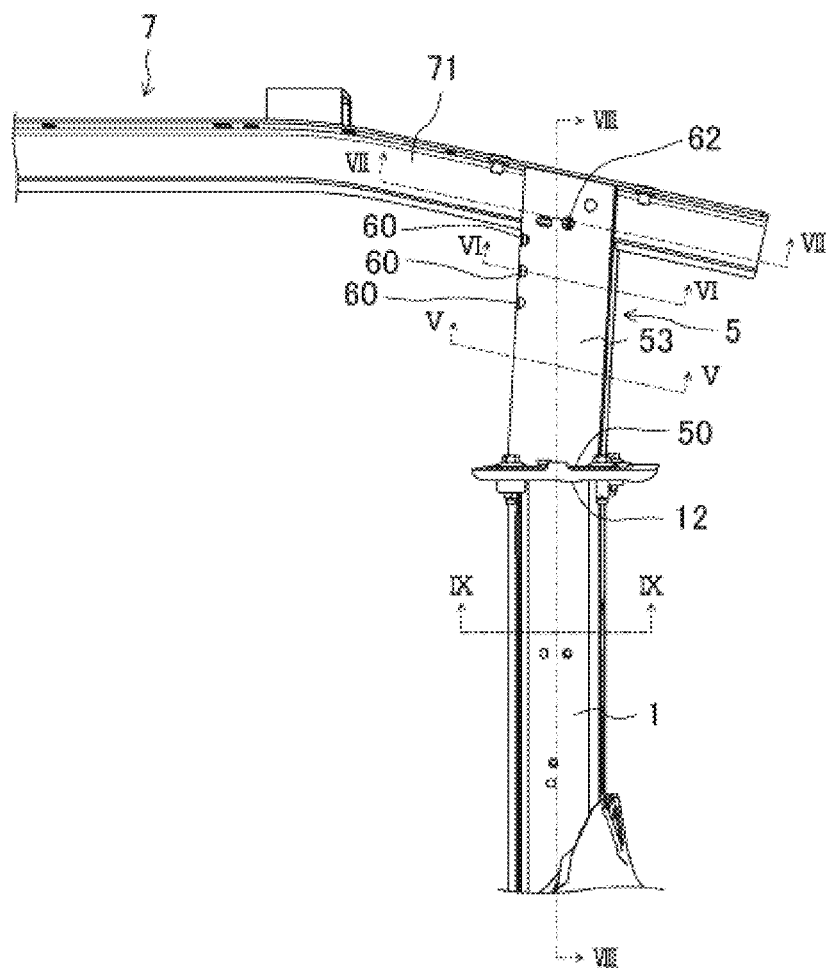
FIG. 4 is an upper view illustrating a crash can.

As illustrated in FIG. 4, in the crash can 5, three ridgeline notches 60 are formed at spaced intervals in the vehicle longitudinal direction (the vertical direction in FIG. 4). Each of these ridgeline notches 60 is formed by cutting out a ridgeline portion that is formed by the inner surface section 51 and the upper surface section 53. FIG. 6 is a cross-sectional view that passes through this ridgeline notch 60.

As illustrated in FIG. 6, the ridgeline notch 60 is formed in the crash can 5, and is formed by cutting out the ridgeline portion that is formed by the inner surface section 51 and the upper surface section 53. The ridgeline notch 60 is also formed in the crash can 5 by cutting out a ridgeline portion that is formed by the inner surface section 51 and the lower surface section 54. A site where the ridgeline notch 60 is formed in the crash can 5 is a vulnerable portion whose strength against a collision load from the front of the vehicle is low.

In addition, as illustrated in FIG. 6, a lateral surface notch 61 is formed in the inner surface section 51 of the crash can 5. The lateral surface notch 61 is opened to the inner surface section 51 in a manner to partially cut the inner surface section 51 away from each of the horizontal ribs 55. A site where the lateral surface notch 61 is formed in the crash can 5 is a vulnerable portion whose strength against a collision load input to the bumper beam 7 is low.

As described above, the ridgeline notch 60 and the lateral surface notch 61 as the vulnerable portions are provided on the inner side in the vehicle width direction of the crash can 5. For this reason, the strength of the crash can 5 against the collision load from the front of the vehicle is lower on the inner side in the vehicle width direction than on the outer side in the vehicle width direction.

In this embodiment, as illustrated in FIG. 4 and FIG. 6, the ridgeline notch 60 and the lateral surface notch 61 are formed such that distances thereof from the rear end portion of the crash can 5 are substantially the same. However, the ridgeline notch 60 and the lateral surface notch 61 may be formed such that the distances thereof from the rear end portion of the crash can 5 differ.

As illustrated in FIG. 4, an upper surface notch 62 is formed in the upper surface section 53 of the crash can 5, is located on the vehicle front side of the above-described ridgeline notch 60, and is opened to the upper surface section 53. FIG. 7 is a cross-sectional view that passes through this upper surface notch 62.

As illustrated in FIG. 7, the upper surface notch 62 is provided in the upper surface section 53 of the crash can 5, and is provided in a manner to partially cut the upper (upper in FIG. 7) vertical rib 56 away from the upper surface section 53. In addition, a lower surface notch 63 is provided in the lower surface section 54 of the crash can 5, and is provided in a manner to partially cut the lower (lower in FIG. 7) vertical rib 56 away from the lower surface section 54.

<Configuration of Front Side Frame>

Figure 9:
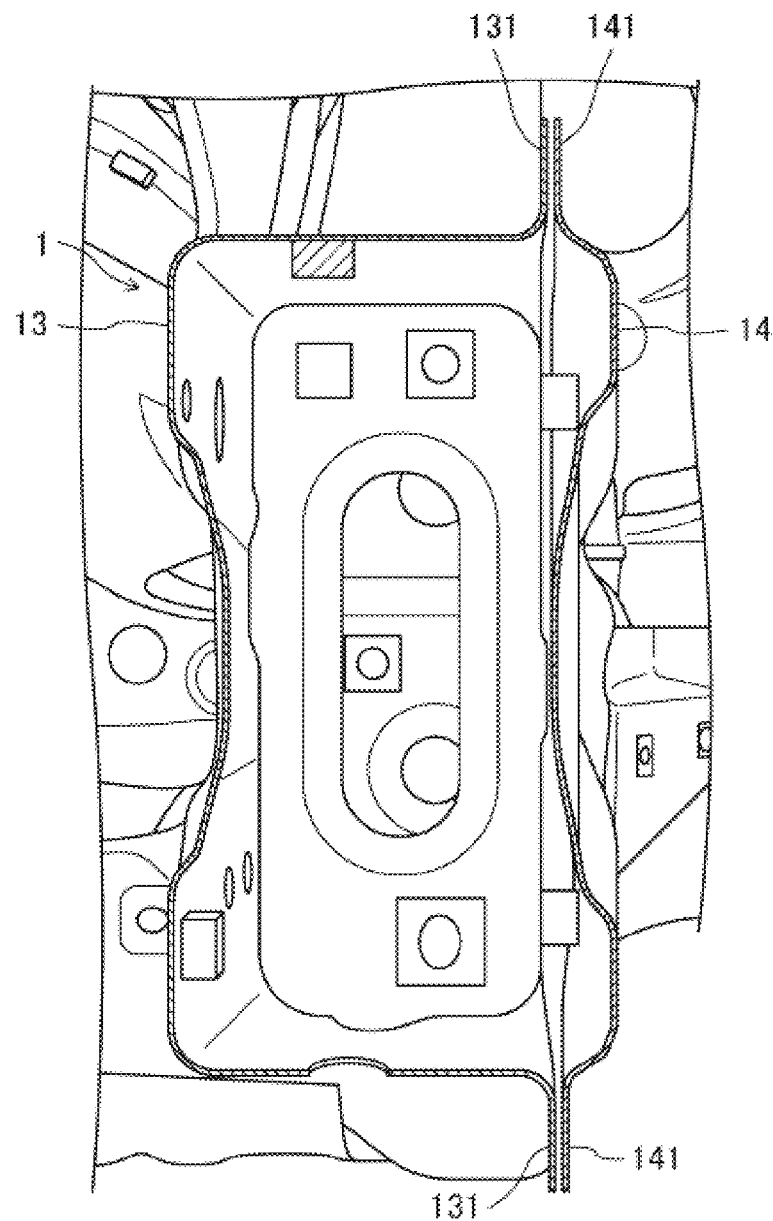
FIG. 9 is a cross-sectional view that is taken along line IX-IX in FIG. 4, FIG. 11, and FIG. 12.
Figure 10:
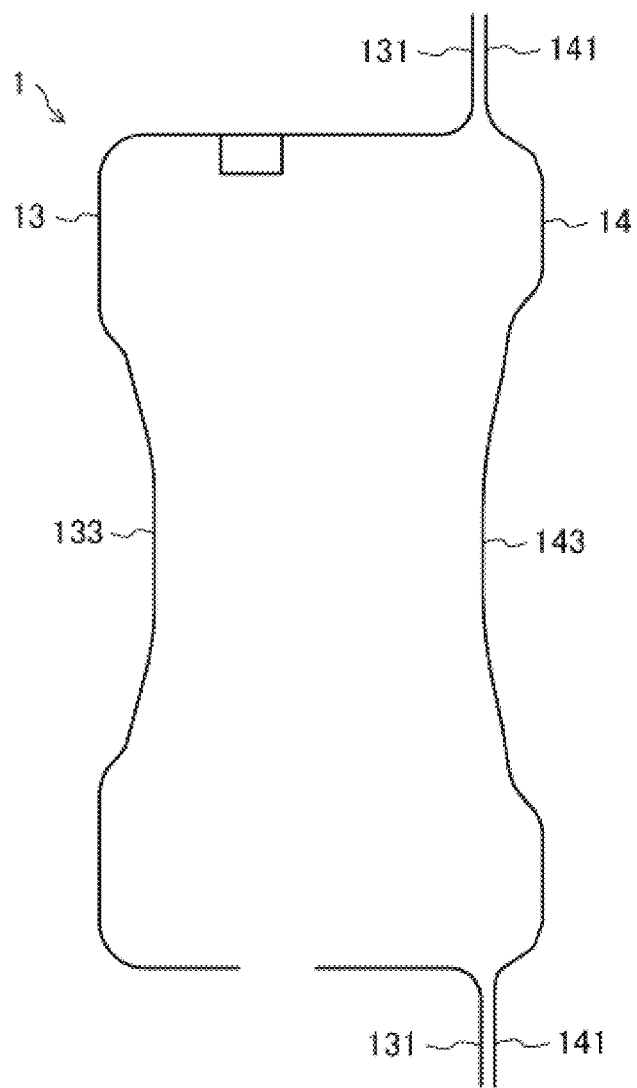
FIG. 10 is a schematic view of FIG. 9.

The front side frames 1, which are provided on both of the sides in the vehicle width direction, have bilaterally-symmetrical structures. For this reason, a detailed description will be made on the structure of the front side frame 1 on the right side (the right side in FIG. 1) in the vehicle width direction. As illustrated in FIG. 9 and FIG. 10, this front side frame 1 is configured by joining an outer panel 13, which is arranged on the outer side in the vehicle width direction, and an inner panel 14, which is arranged on the inner side in the vehicle width direction. Each of the outer panel 13 and the inner panel 14 is formed by pressing a steel sheet, for example. An outer joint flange 131 is formed in each of upper and lower portions of the outer panel 13. Meanwhile, an inner joint flange 141 is formed in each of upper and lower portions of the inner panel 14. Each of these outer flanges 131 is joined to respective one of the inner flanges 141 by spot welding or the like. Joint positions between the outer panel 13 and the inner panel 14 are located on the inner side of a central portion in the vehicle width direction of the front side frame 1.

Figure 11:
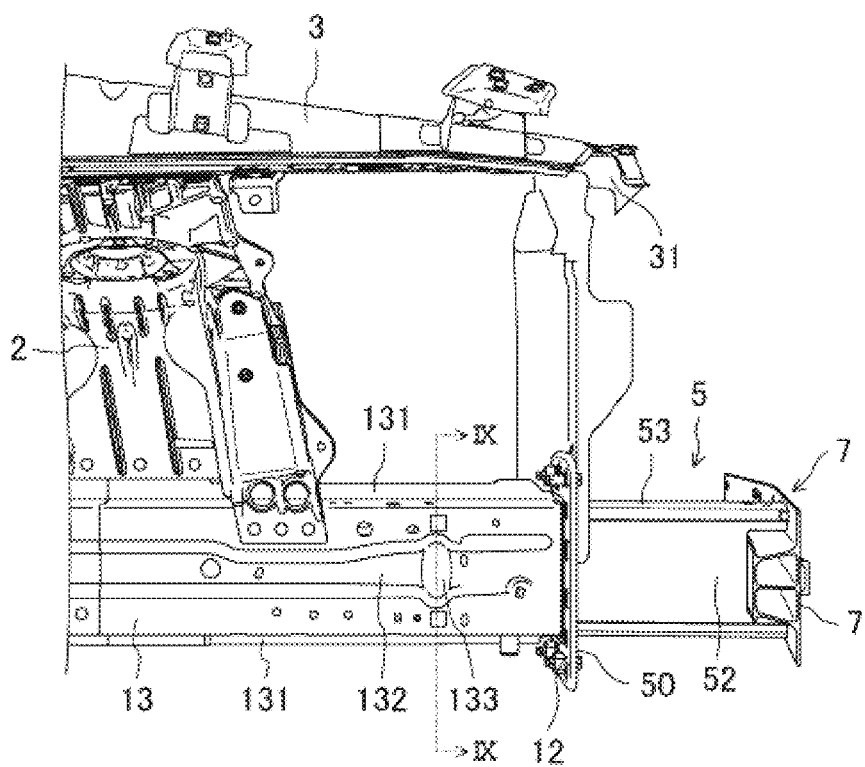
FIG. 11 is a side view of the front side frame.

FIG. 11 is a view in which the front side frame 1 is seen from the outer side in the vehicle width direction. As illustrated in FIG. 11, an outer longitudinal irregular bead 132 as a longitudinal irregular bead is formed on the outer panel 13 of the front side frame 1, and extends in the vehicle longitudinal direction (the right-left direction in FIG. 11). On the vehicle front side (the right side in FIG. 11) of the suspension housing 2, the outer longitudinal irregular bead 132 is formed with an outer bead width increased section 133 having a partially increased bead width. A site where the outer bead width increased section 133 is provided in the front side frame 1 is an outer vulnerable portion whose strength against the collision load from the front of the vehicle is low.

Figure 12:
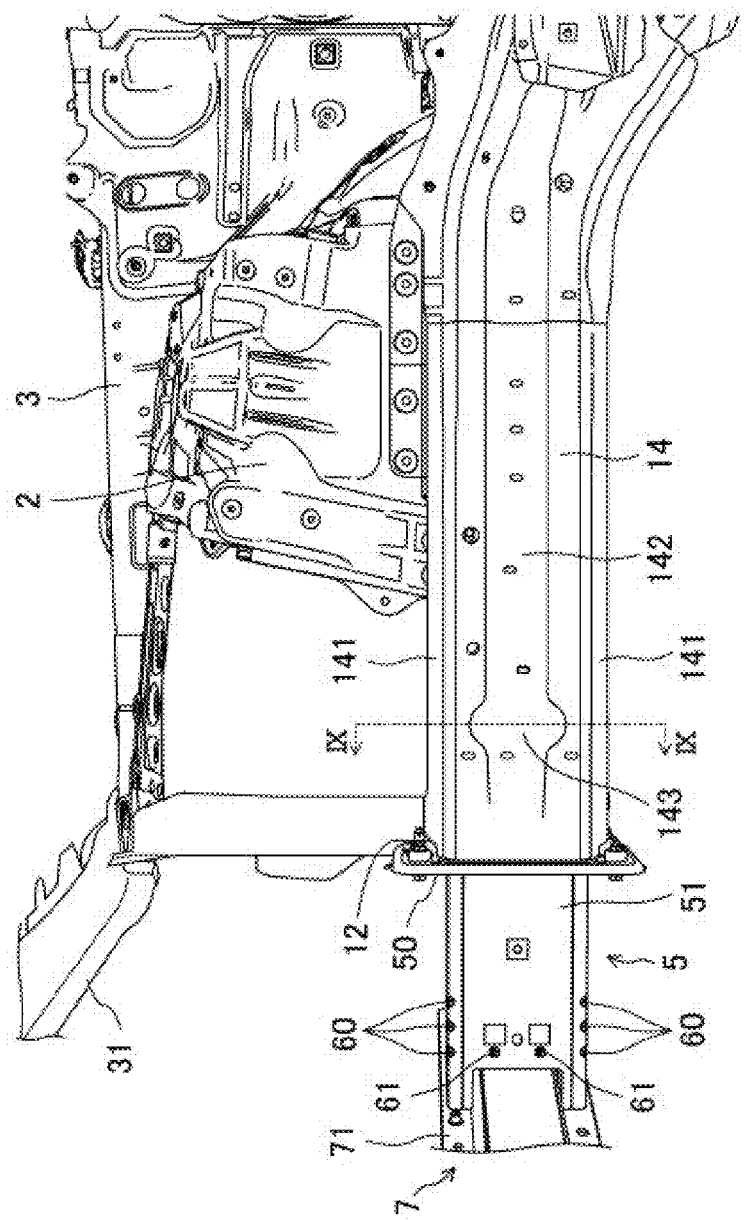
FIG. 12 is another side view of the front side frame.

FIG. 12 is a view in which the front side frame 1 is seen from the inner side in the vehicle width direction. As illustrated in FIG. 12, an inner longitudinal irregular bead 142 as a longitudinal irregular bead is provided on the inner panel 14 of the front side frame 1, and extends in the vehicle longitudinal direction (the right-left direction in FIG. 12). On the vehicle front side (a left side in FIG. 12) of the suspension housing 2, the inner longitudinal irregular bead 142 is formed with an inner bead width increased section 143 having a partially increased bead width. A site where the inner bead width increased section 143 is provided in the front side frame 1 is an inner vulnerable portion whose strength against the collision load from the front of the vehicle is low.

FIG. 9 illustrates a cross-section of the front side frame 1 that passes through the outer bead width increased section 133 and the inner bead width increased section 143 described above. FIG. 10 illustrates a contour shape of the cross-section illustrated in FIG. 9. As illustrated in FIG. 10, a vertical dimension of the outer bead width increased section 133 is smaller than a vertical dimension of the inner bead width increased section 143. For this reason, strength of the outer bead width increased section 133 against the collision load from the front of the vehicle is greater than that of the inner bead width increased section 143.

<Operational Effects at Offset Collision>

First, a description will be made on operational effects at the offset collision. When the vehicle according to the present disclosure is involved in the offset collision, this collision load is input to the bumper beam 7 via a front bumper and the like. The inclined section 71 is provided in the outer end portion in the vehicle width direction of the bumper beam 7. The crash can 5 receives the collision load of the offset collision via this inclined section 71. Thus, the crash can 5 receives the collision load having a component in a direction orthogonal to the inclined section 71 of the bumper beam 7.

Due to the collision load of the offset collision, the crash can 5 receives a compressive force between the inclined section 71 of the bumper beam 7 and the front side frame 1. This crash can 5 extends forward in the vehicle, and is inclined outward in the vehicle width direction. In other words, an axial direction of the crash can 5 is inclined in the direction orthogonal to the inclined section 71 of the bumper beam 7 with respect to the vehicle longitudinal direction. Accordingly, when the crash can 5 receives the collision load in the direction orthogonal to the inclined section 71, in the collision load input to the crash can 5, a load component in an axial direction of the crash can 5 is large. In this way, the crash can 5 is suppressed from being bent inward from a base by the collision load of the offset collision, and the crash can 5 is easily crushed and deformed in the axial direction (the longitudinal direction).

Figure 13:
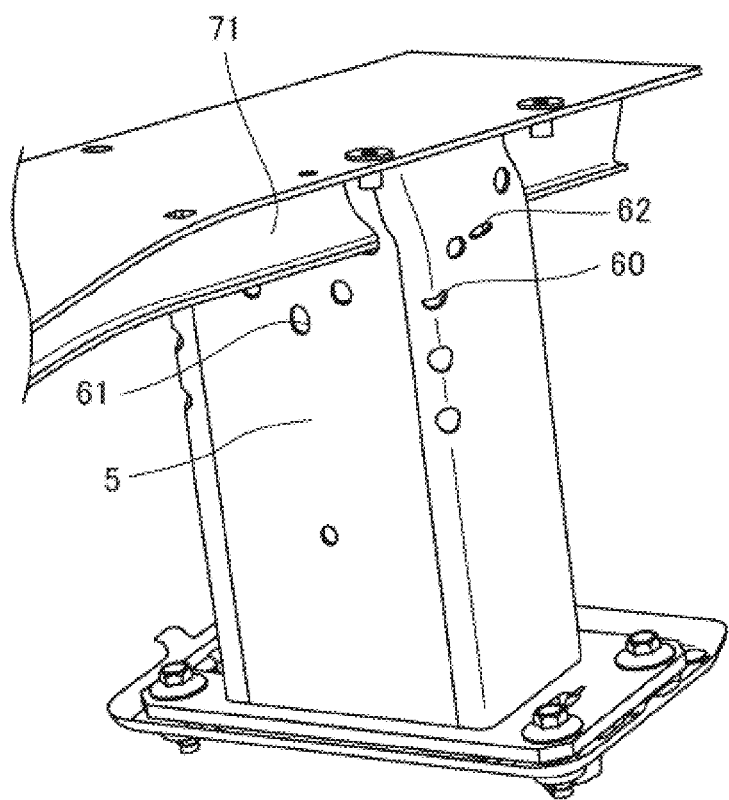
FIG. 13 is a view illustrating the crash can that is crushed by an offset collision.

FIG. 13 illustrates the crash can 5 that starts being crushed and deformed by the collision load of the offset collision. The crash can 5 is provided with the upper surface notch 62 and the lower surface notch 63, on each of which stress tends to be concentrated, as well as the ridgeline notch 60 and the lateral surface notch 61, each of which is located on the inner side in the vehicle width direction, and, on each of which the stress also tends to be concentrated. The upper surface notch 62 and the lower surface notch 63 are formed on the vehicle front side and on the outer side in the vehicle width direction of the ridgeline notch 60 and the lateral surface notch 61. For this reason, the collision load of the offset collision is first transmitted to the upper surface notch 62 and the lower surface notch 63, and thus the stress is concentrated on the upper surface notch 62 and the lower surface notch 63. Then, the upper surface notch 62 and the lower surface notch 63 are crushed and deformed. Thereafter, the collision load, which has been transmitted to the upper surface notch 62 and the lower surface notch 63, is transmitted to the ridgeline notch 60 and the lateral surface notch 61, each of which is located on the inner side in the vehicle width direction, and, on each of which the stress tends to be concentrated. As a result, the stress is concentrated on the ridgeline notch 60 and the lateral surface notch 61, and the ridgeline notch 60 and the lateral surface notch 61 are thus crushed and deformed.

Just as described, the crash can 5 is provided with the upper surface notch 62 and the lower surface notch 63. Thus, when the bumper beam 7 receives the collision load of the offset collision, the stress is concentrated on the ridgeline notch 60 and the lateral surface notch 61. In this way, the stress is suppressed from being concentrated on the rear end portion (the base portion) of the crash can 5. As a result, displacement in an unintended direction, such as buckling, of the crash can 5 is suppressed, and the crash can 5 is easily crushed and deformed.

In addition, a contour shape of the rear end portion of the crash can 5 is substantially the same as a contour shape of the front end portion of the front side frame 1. Accordingly, when the crash can 5 receives the collision load of the offset collision via the inclined section 71 of the bumper beam 7, the rear end portion of the crash can 5 can firmly be supported by the front end portion of the front side frame 1. As a result, the displacement in the unintended direction, such as buckling, of the crash can 5 by the collision load is suppressed, and the crash can 5 is easily crushed and deformed.

When attention is focused on the load input in the axial direction of the crash can 5, the load input to the outer surface section 52 of the crash can 5 is larger than the load input to the inner surface section 51 thereof. Thus, while the outer surface section 52 tends to be plastically distorted in the axial direction to absorb collision energy, the inner surface section 51 is less prone to the plastic distortion. For this reason, the ridgeline notch 60 and the lateral surface notch 61 as the vulnerable portions are provided to the inner surface section 51, so as to promote the plastic distortion of the inner surface section 51 in a similar manner to the outer surface section 52. In this way, absorption of the collision energy by the inner surface section 51 is improved.

The crash can 5 is also subjected to an inward bending force in the vehicle width direction by the collision load of this offset collision. Then, the inward bending force in the vehicle width direction is also applied to the front side frame 1 via the crash can 5.

When the front side frame 1 is bent and deformed by this inward bending force in the vehicle width direction, the outer side in the vehicle width direction of the front side frame 1 is a tensile side, and the inner side in the vehicle width direction of the front side frame 1 is a compressive side. For this reason, the bead width of the inner bead width increased section 143 of the front side frame 1 is set to be larger than the bead width of the outer bead width increased section 133 thereof. In this way, the strength on the outer side in the vehicle width direction of the front side frame 1 is made greater than the strength on the inner side in the vehicle width direction of the front side frame 1, so as to suppress bending deformation of the front side frame 1 by this moment.

Just as described, the front side frame 1 is not subjected to the bending deformation, which is caused by the input of the collision load of the offset collision, and the rear end portion of the crash can 5 is firmly supported by the front end portion of the front side frame 1. As a result, the displacement in the unintended direction, such as buckling, of the crash can 5 by the collision load of the offset collision is suppressed, and the crash can 5 is easily crushed and deformed.

Only for a purpose of improving the strength on the outer side in the vehicle width direction of the front side frame 1 to be greater than the strength on the inner side in the vehicle width direction of the front side frame 1, only the inner bead width increased section 143 may be provided, and the outer bead width increased section 133 may not be provided. However, by providing the outer bead width increased section 133 to the front side frame 1, the strength on the vehicle rear side of the front side frame 1 becomes greater than the strength on the vehicle front side of the front side frame 1. Thus, when the front side frame 1 receives the collision load, which is generated by the collision of the vehicle, the front side frame 1 is sequentially crushed and deformed from the vehicle front side toward the vehicle rear side.

As described above, since the crash can 5 is crushed and deformed between the bumper beam 7 and the front side frame 1 without buckling, the crash can 5 demonstrates energy absorption performance for the collision load of the offset collision.

<Operational Effects at Full-Frontal Collision>

Next, a description will be made on operational effects at the full-frontal collision. When the vehicle according to the present disclosure is involved in the full-frontal collision, the vehicle receives the collision load from the front. This collision load is input to the bumper beam 7 via the front bumper or the like. Due to the collision load input to the bumper beam 7, the compressive force acts on each of the crash cans 5 on both of the sides in the vehicle width direction a compressive force.

Each of the crash cans 5 is attached to the respective front side frame 1. For this reason, each of the crash cans 5 receives the compressive force between the bumper beam 7 and the front side frame 1.

As described above, the crash can 5 is inclined in consideration of the absorption of the collision energy in the case of the offset collision. Thus, due to the inclination of the crash can 5, the crash can 5 tends to collapse outward from the base at the full-frontal collision. For this reason, the ridgeline notch 60 and the lateral surface notch 61 as the vulnerable portions are formed in the inner surface section 51 of the crash can 5. Thus, when the above-described compressive force acts on the crash can 5, the stress is concentrated on the ridgeline notch 60 and the lateral surface notch 61 thereof. In this way, the crash can 5 is more easily and plastically distorted on the inner surface section 51 side than on the outer surface section 52 side. As a result, the outward collapse of the crash can 5 at the full-frontal collision is suppressed to cause the crash can 5 to be crushed and deformed. Thus, absorption of the collision energy by the crash can 5 is improved.

In addition, the contour shape of the rear end portion of each of the crash cans 5 is substantially the same as the contour shape of the front end portion of the respective front side frame 1. Accordingly, when the crash can 5 receives the collision load via the bumper beam 7, the rear end portion of the crash can 5 can firmly be supported by the front end portion of the front side frame 1. As a result, the displacement in the unintended direction, such as buckling, of the crash can 5 by the collision load is suppressed, and the crash can 5 is easily crushed and deformed.

As described above, since the crash can 5 is crushed and deformed between the bumper beam 7 and the front side frame 1 without buckling, the crash can 5 demonstrates the energy absorption performance for the collision load of the full-frontal collision.

The front side frame 1 is provided with the outer bead width increased section 133 and the inner bead width increased section 143. In this way, the strength on the vehicle rear side of the front side frame 1 becomes greater than the strength on the vehicle front side of the front side frame 1. Thus, when the front side frame 1 receives the collision load, which is generated by the collision of the vehicle, the front side frame 1 is sequentially crushed and deformed from the vehicle front side toward the vehicle rear side.

EMBODIMENT AND COMPARATIVE EXAMPLES

Figure 14:
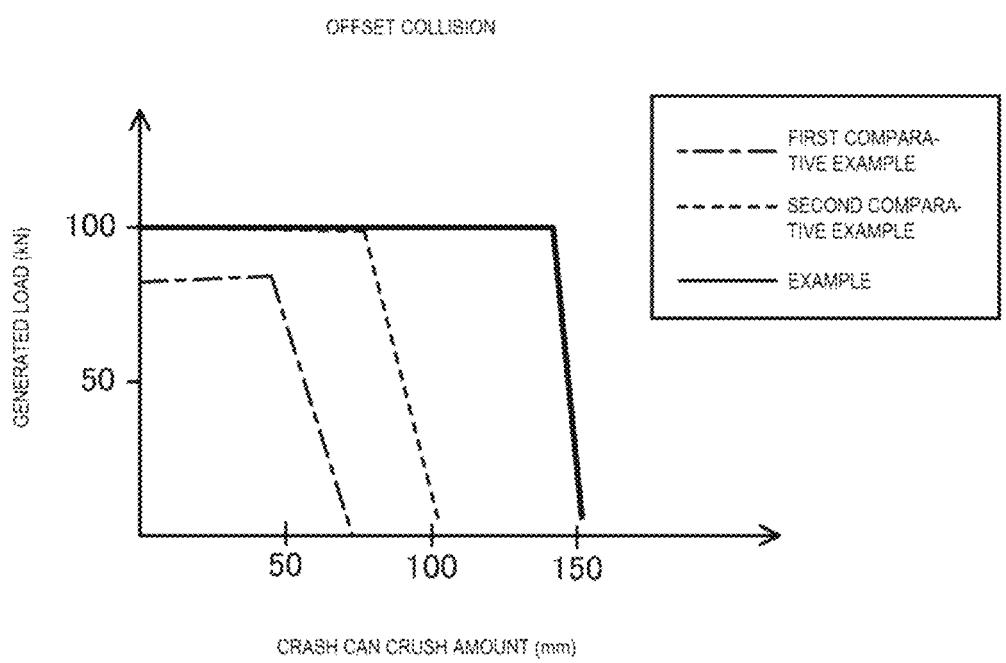
FIG. 14 is an FS diagram in an example and comparative examples.

FIG. 14 is an FS diagram of the crash can 5 as the example according to the embodiment of the present disclosure, a straight crash can as a first comparative example, and an inclined crash can as a second comparative example. This FS diagram illustrates a buckling load on the crash can by the offset collision and a crush amount of the crash can that is crushed by the collision load. A vertical axis of this FS diagram represents the buckling load (kN) of the crash can by the offset collision. A horizontal axis of this FS diagram represents the crush amount (mm) of the crash can. This graph represents a characteristic of each of the crash cans. An area of a region that is surrounded by each of the graphs, the vertical axis, and the horizontal axis corresponds to a total amount of the energy absorbed by the respective crash can at the offset collision.

The first comparative example is the conventional straight crash can that extends forward in the vehicle from the front end portion of the front side frame. The straight crash can as the first comparative example is not provided with a vulnerable portion.

The second comparative example is the inclined crash can that extends forward in the vehicle from the front end portion of the front side frame and is inclined outward in the vehicle width direction. Similar to the first comparative example, the inclined crash can as the second comparative example is not provided with a vulnerable portion.

The example is the inclined crash can that extends forward in the vehicle from the front end portion of the front side frame and is inclined outward in the vehicle width direction. In addition, the inclined crash can as the example is formed with the inner vulnerable portion having the low strength against the collision load, which is input to the bumper beam.

As illustrated in FIG. 14, in the case of the first comparative example, the crash can collapses inward (buckles) early from the base thereof due to the offset collision. Thus, a rise of the load is low, and the crush amount is small. In the case where the crash can is inclined as in the second comparative example, an input direction of the collision load is brought close to the axial direction of the crash can. Thus, a load level is increased, and load sustainment is improved. However, when the load input in the axial direction of the crash can is observed, the load input to the ridgeline on the outer side in the vehicle width direction is greater than the load input to the ridgeline on the inner side in the vehicle width direction, and thus the crash can tends to collapse inward. Thus, the load sustainment is not significantly improved.

On the contrary, in the case of the example, a difference in the load input in the crash can between the inner side and the outer side in the vehicle width direction is reduced by the inner vulnerable portion. Thus, the inner ridgeline and the outer ridgeline exhibit similar deformation behavior. As a result, the load sustainment (the crush amount) is improved, and an overall collision energy absorption amount can significantly be improved.

Second Embodiment

A detailed description will hereinafter be made on a second embodiment with reference to the drawing. In the following description, the common components to those in the above-described first embodiment will be denoted by the same reference signs and numerals, and the detailed description thereon will not be made.

Figure 15:
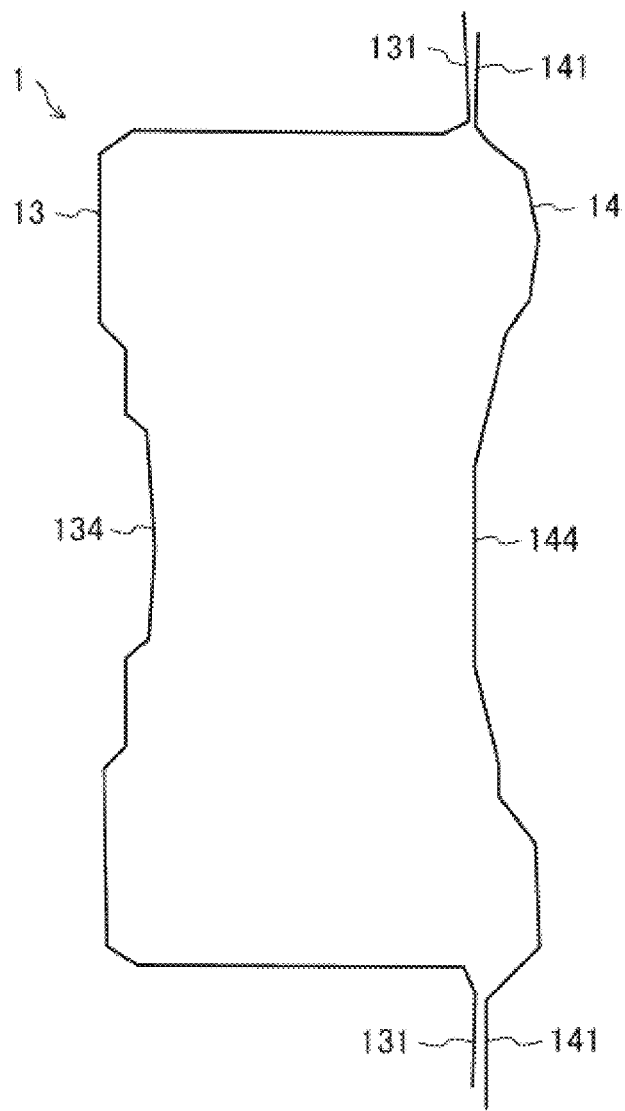
FIG. 15 is a view corresponding to FIG. 9 according to a second embodiment.

In this second embodiment, the outer vulnerable portion and the inner vulnerable portion, which are formed in the front side frame 1 provided on each of the sides in the vehicle width direction, have different shapes from each other. More specifically, in the second embodiment, as illustrated in FIG. 15, an outer vertical irregular bead 134 is formed in the outer surface section in the vehicle width direction of the front side frame 1, and extends vertically as the outer vulnerable portion. In addition, an inner vertical irregular bead 144 is formed in the inner surface section in the vehicle width direction of the front side frame 1, and extends vertically as the inner vulnerable portion. A vertical dimension of this outer vertical irregular bead 134 is smaller than a vertical dimension of the inner vertical irregular bead 144. For this reason, strength of the outer vertical irregular bead 134 becomes greater than strength on the inner vertical irregular bead 144.

In this way, the outer vulnerable portion and the inner vulnerable portion can be formed by simple processing of providing the vertically extending irregular beads to the front side frame 1. In addition, the strength of the outer vertical irregular bead 134 can be made greater than the strength of the inner vertical irregular bead 144 by simple processing of reducing the vertical dimension of the outer vertical irregular bead 134 to be smaller than the vertical dimension of the inner vertical irregular bead 144.

In the second embodiment, the configuration other than the outer vulnerable portion and the inner vulnerable portion is the same as that in the first embodiment. Thus, the description thereof will not be made.

DESCRIPTION OF REFERENCE SIGNS AND NUMERALS

1 Front side frame
2 Suspension housing
5 Crash can
7 Bumper beam
60 Ridgeline notch
61 Lateral surface notch
62 Upper surface notch
63 Lower surface notch
71 Inclined section
132 Outer longitudinal irregular bead
133 Outer bead width increased section
134 Outer vertical irregular bead
142 Inner longitudinal irregular bead
143 Inner bead width increased section
144 Inner vertical irregular bead

The invention claimed is:

1. A vehicle front body structure comprising:
a front side frame that is provided on each of right and left sides of a vehicle and extends in a vehicle longitudinal direction; and
a bumper beam that is provided on a vehicle front side of each of the front side frames and has an inclined section in each end portion in a vehicle width direction, the inclined section extending outward in the vehicle width direction and being inclined rearward in the vehicle, wherein
a crash can is provided to a front end portion of each of the front side frames, extends forward in the vehicle, and is inclined outward in the vehicle width direction,
a front end portion of each of the crash cans is coupled to the respective inclined section of the bumper beam, and
a vulnerable portion is provided on an inner side in the vehicle width direction of each of the crash cans, and has low strength against a collision load from front of the vehicle.

2. The vehicle front body structure according to claim 1, wherein
a contour of a cross-section in a rear end portion of each of the crash cans has substantially a same shape as a contour of a cross-section in the front end portion of the respective front side frame.

3. The vehicle front body structure according to claim 2, wherein
each of the crash cans has:
a lateral surface section that faces the inner side in the vehicle width direction;
an upper surface section that faces above in the vehicle; and
a lower surface section that faces below in the vehicle, and
the vulnerable portion is formed by a ridgeline notch that cuts out at least one of a ridgeline portion formed by the lateral surface section and the upper surface section and a ridgeline portion formed by the lateral surface section and the lower surface section.

4. The vehicle front body structure according to claim 3, wherein
a horizontal rib is formed in each of the crash cans and extends in the vehicle longitudinal direction, and
the vulnerable portion is formed by a lateral surface notch that is opened to the inner side in the vehicle width direction, and is formed in a manner to partially cut the lateral surface section on the inner side in the vehicle width direction of the crash can away from the horizontal rib.

5. The vehicle front body structure according to claim 4, wherein
a suspension housing is joined to an intermediate portion in the vehicle longitudinal direction of each of the front side frames,
an outer vulnerable portion is provided on the outer side in the vehicle width direction of each of the front side frames, is located on the vehicle front side of the respective suspension housing, and has low strength against the collision load from the front of the vehicle,
an inner vulnerable portion is provided on the inner side in the vehicle width direction of each of the front side frames, is located on the vehicle front side of the respective suspension housing, and has low strength against the collision load from the front of the vehicle, and
the strength of the outer vulnerable portion of each of the front side frames is greater than the strength of the inner vulnerable portion thereof.

6. The vehicle front body structure according to claim 5, wherein
a longitudinal irregular bead is provided on each lateral surface in the vehicle width direction of each of the front side frame, and extends in the vehicle longitudinal direction,
the longitudinal irregular bead, which is provided on the outer side in the vehicle width direction of each of the front side frames, is formed with an outer bead width increased section as the outer vulnerable portion having a partially increased bead width,
the longitudinal irregular bead, which is provided on the inner side in the vehicle width direction of each of the front side frames, is formed with an inner bead width increased section as the inner vulnerable portion having a partially increased bead width, and
the outer bead width increased section of each of the front side frames has the smaller bead width than the inner bead width increased section thereof.

7. The vehicle front body structure according to claim 5, wherein
a vertical irregular bead as the outer vulnerable portion is formed on an outer surface in the vehicle width direction of each of the front side frames, and extends vertically,
a vertical irregular bead as the inner vulnerable portion is formed on an inner surface in the vehicle width direction of each of the front side frames, and extends vertically, and
a vertical dimension of the vertical irregular bead on the outer surface in the vehicle width direction of each of the front side frames is smaller than a vertical dimension of the vertical irregular bead on the inner surface in the vehicle width direction thereof.

8. The vehicle front body structure according to claim 7, wherein
each of the crash cans is formed with:
a vertical rib that extends in the vehicle longitudinal direction and couples the horizontal rib and the upper surface section or the lower surface section; and
a notch that is opened to the upper surface section or the lower surface section in a manner to partially cut the upper surface section or the lower surface section of each of the crash cans away from the vertical rib, and
the notch that is opened to the upper surface section or the lower surface section is formed on a vehicle front side of the vulnerable portion.

9. The vehicle front body structure according to claim 6, wherein
each of the crash cans is formed with:
a vertical rib that extends in the vehicle longitudinal direction and couples the horizontal rib and the upper surface section or the lower surface section; and
a notch that is opened to the upper surface section or the lower surface section in a manner to partially cut the upper surface section or the lower surface section of each of the crash cans away from the vertical rib, and
the notch that is opened to the upper surface section or the lower surface section is formed on a vehicle front side of the vulnerable portion.

10. The vehicle front body structure according to claim 1, wherein each of the crash cans has:

a lateral surface section that faces the inner side in the vehicle width direction;

an upper surface section that faces above in the vehicle; and a lower surface section that faces below in the vehicle, and the vulnerable portion is formed by a ridgeline notch that cuts out at least one of a ridgeline portion formed by the lateral surface section and the upper surface section and a ridgeline portion formed by the lateral surface section and the lower surface section.

11. The vehicle front body structure according to claim 1, wherein a horizontal rib is formed in each of the crash cans and extends in the vehicle longitudinal direction, and the vulnerable portion is formed by a lateral surface notch that is opened to the inner side in the vehicle width direction, and is formed in a manner to partially cut a lateral surface section on the inner side in the vehicle width direction of the crash can away from the horizontal rib.

12. The vehicle front body structure according to claim 1, wherein a suspension housing is joined to an intermediate portion in the vehicle longitudinal direction of each of the front side frames, an outer vulnerable portion is provided on the outer side in the vehicle width direction of each of the front side frames, is located on the vehicle front side of the respective suspension housing, and has low strength against the collision load from the front of the vehicle, an inner vulnerable portion is provided on the inner side in the vehicle width direction of each of the front side frames, is located on the vehicle front side of the respective suspension housing, and has low strength against the collision load from the front of the vehicle, and the strength of the outer vulnerable portion of each of the front side frames is greater than the strength of the inner vulnerable portion thereof.

* * * * *